Aug. 6, 1946.   E. R. STIVERS   2,405,463
BOX
Filed July 7, 1943

INVENTOR.
EARL R. STIVERS
BY Edward F. Dunne
Attorney

Patented Aug. 6, 1946

2,405,463

UNITED STATES PATENT OFFICE 2,405,463

BOX

Earl R. Stivers, Rockaway, N. J., assignor to Stapling Machines Co., a corporation of Delaware Application July 7, 1943, Serial No. 493,797

3 Claims. (Cl. 217—12)

This invention relates to boxes, and particularly to wirebound boxes.

It is an object of the invention to provide an efficient box for the shipment of munitions, such as shells, shell casings, cylindrical casing for ammunition, and the like.

It is a further object to provide a box which may be readily divided lengthwise the box.

It is a further object to provide a removable, lengthwise divider for a box.

It is a further object to provide an efficient and economical box to carry a plurality of cylindrical objects safely to destination.

One illustrative embodiment of the invention is shown in the accompanying drawing, in which—

Figure 1:
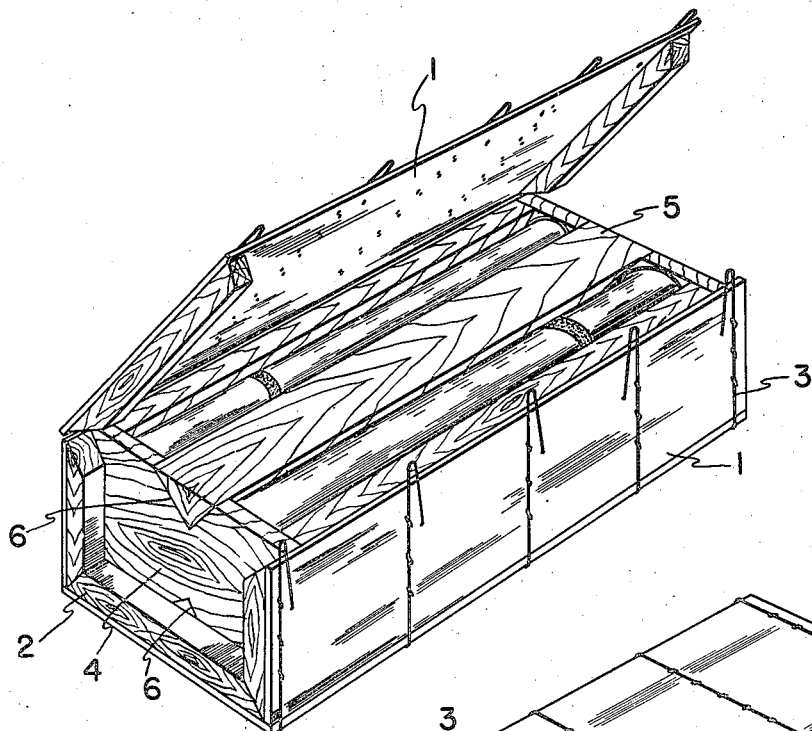
Figure 1 is a perspective view of a loaded box with the lid raised.

Referring to Fig. 1, the box comprises four side sections of side material 1 and cleats 2 connected together by flexible binders 3 stapled to the side material and the cleats, and ends 4.

Figure 2:
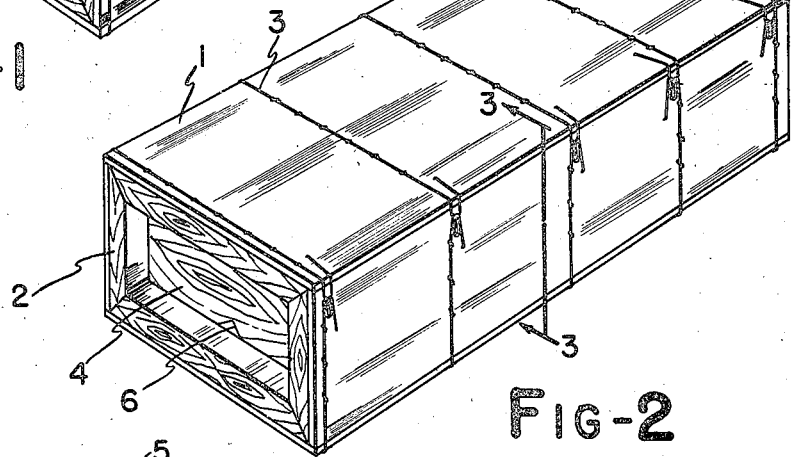
Fig. 2 is the same view of the box as Fig. 1, but with the lid closed.

The side material 1 may be made of veneer, resawed lumber, or fiberboard. The cleats 2 and the ends 4 are usually made of wood. The flexible binders 3 are preferably wires and may be provided at their ends with interengageable loops to close the lid, as shown in Fig. 2.

The cleats 2 form an interior cleat frame at the end of the box; and the end 4 is located inside the cleat frame and contacts the inner faces of the cleats, to be held thereby against outward displacement.

Figure 3:
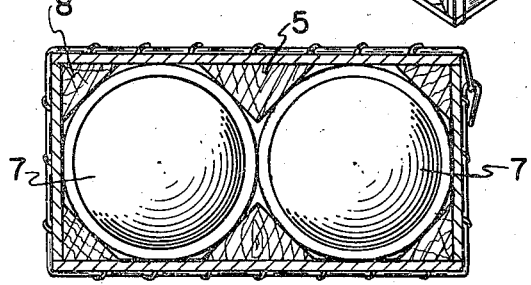
Fig. 3 is a cross-section of the loaded box, taken on line 3—3 of Fig. 2.

To receive lengthwise dividers 5, preferably made of wood, and hold them against lateral displacement, the ends 4 are provided, at their top and bottom edges, with notches 6 of a shape corresponding to the cross-sectional shape of the divider 5. In the illustrative box, the divider 5 is triangular in cross section, to contact and hold, in spaced relationship, a pair of cylindrical objects 7, as shown in Fig. 3. Lengthwise displacement of the divider 5 is prevented by the cleats 2. To further support the cylindrical objects 7, packing strips 8, preferably made of wood, may be provided. As shown in Fig. 3, these strips 8 may also be triangular in cross section, to fit into the box corner and contact the cylindrical object. It will be understood that the divider 5 and the strips 8 may assume other than triangular cross-sectional form, depending upon the shape of the objects to be carried in the box, and that additional dividers 5 may be provided.

As best shown in Fig. 3, the dividers 5 contact and hold, in spaced relationship, the objects 7, and thus prevent damaging contacts between the objects 7 and also prevent the combined weight of the two objects 7 from being shifted against a box side when the box is dropped on its side or edge. This is particularly advantageous because, when a box is dropped on its side or edge, the damage which occurs depends upon the amount of weight or mass that must be stopped by the box as a result of the impact. By dividing the box into compartments which keep the content objects separated and so prevent them from combining their weight or mass under impact, the resulting damage to the box and contents is greatly reduced.

Heretofore, it has been difficult to divide a box lengthwise efficiently and economically, as it was necessary to nail or otherwise secure the dividing elements to other box elements, thereby requiring these other elements to be thick and heavy in order to receive and hold the nails or other securing means.

According to the present invention, the notched ends 4, the lengthwise dividers 5, and the strips 8 need not be nailed or otherwise secured to other box elements, thus permitting such other box elements to be made of thinner and lighter materials. The separate and removable ends and dividers also permit the box to be readily knocked down for storage and again readily set up for a second use.

It will be understood that the invention is not to be limited to the specific embodiment shown for purposes of illustration, and that all of the features of the invention need not be used conjointly, as they may be used to advantage in various combinations, as defined in the claims.

I claim:

1. In a box having four sides and an interior cleat frame at each end of the box, means to close the ends and divide the box lengthwise comprising: an unattached end section at each end of the box, contacting the cleat frame and held thereby against outward displacement, and having V-shaped notches cut or formed in the top and bottom edges of the section; and a pair of unattached dividers, each triangular in cross section, extending lengthwise the box intermediate its sides and resting in the notches in the end sections and held against substantial longitudinal displacement by adjacent cleats.

2. In a box having four sides and an interior cleat frame at each end of the box, means to close the ends and divide the box lengthwise comprising: an unattached end section at each end of the box, contacting the cleat frame and held thereby against outward displacement, and having V-shaped notches cut or formed in the top and bottom edges of the section; and a pair of unattached dividers, each triangular in cross section, extending lengthwise the box intermediate its sides and resting in notches in the end sections, each end of each divider contacting the inner face of its adjacent cleat.

3. In a box having four sides and an interior cleat frame at each end of the box, means to close the ends and divide the box lengthwise comprising: an unattached end section at each end of the box, contacting the cleat frame and held thereby against outward displacement and having a V-shaped notch cut or formed in an edge of the section; and a divider triangular in cross section, extending lengthwise the box intermediate its sides and resting in notches in the end sections, each end of the divider contacting the inner face of its adjacent cleat.

EARL R. STIVERS.